(12) United States Patent
Martin (10) Patent No.: US 11,650,837 B2
(45) Date of Patent: May 16, 2023

(54) LOCATION-BASED VIRTUALIZATION WORKLOAD PLACEMENT

(71) Applicant: Hewlett Packard Enterprise Development LP, Houston, TX (US)

(72) Inventor: Brian J. Martin, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 364 days.

(21) Appl. No.: 16/396,591

(22) Filed: Apr. 26, 2019

(65) Prior Publication Data

US 2020/0341794 A1 Oct. 29, 2020

(51) Int. Cl.
*G06F 9/455* (2018.01)
*H04L 41/12* (2022.01)
*G06F 9/48* (2006.01)
*G06F 9/50* (2006.01)
*H04L 43/065* (2022.01)

(52) U.S. Cl.
CPC ........ *G06F 9/45558* (2013.01); *G06F 9/4881* (2013.01); *G06F 9/5083* (2013.01); *H04L 41/12* (2013.01); *H04L 43/065* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,683,023 B1 * | 3/2014 | Brandwine | H04L 45/64 709/222 |
| 9,130,844 B1 * | 9/2015 | Malik | H04L 41/0896 |
| 9,888,067 B1 * | 2/2018 | Yemini | H04L 67/1008 |
| 10,585,714 B2 * | 3/2020 | Aronovich | G06F 9/4881 |
| 10,613,888 B1 * | 4/2020 | Mentz | G06F 9/4401 |
| 10,757,048 B2 * | 8/2020 | Pfriem | H04L 51/216 |
| 10,908,940 B1 * | 2/2021 | Farhan | H04L 41/0806 |
| 11,087,087 B1 * | 8/2021 | Mayer | G06F 40/289 |
| 2014/0059310 A1 * | 2/2014 | Du | G06F 3/065 711/162 |
| 2016/0217050 A1 * | 7/2016 | Grimm | G06F 11/203 |
| 2016/0378518 A1 | 12/2016 | Antony et al. | |
| 2017/0237647 A1 * | 8/2017 | N. | H04L 41/0893 709/224 |

(Continued)

OTHER PUBLICATIONS

Janakiram, M.; "How Kubernetes is Transforming into a Universal Scheduler"; Sep. 7, 2018; 13 pages.

(Continued)

*Primary Examiner* — Dhairya A Patel
(74) *Attorney, Agent, or Firm* — Mauriel Kapouytian Woods LLP (57) ABSTRACT

In some examples, a method includes: receiving, with a computer virtualization scheduler, network locality information for virtualization equipment; receiving, with the computer virtualization scheduler, network utilization information for virtualization equipment; and determining, with the computer virtualization scheduler and based on the received network locality information and the received network utilization information, virtualization workload placement in order to maximize available network bandwidth and minimize network latency between virtualization equipment.

21 Claims, 7 Drawing Sheets

(56) References Cited

U.S. PATENT DOCUMENTS

| | | | | |
|---|---|---|---|---|
| 2018/0019948 | A1* | 1/2018 | Patwardhan | H04L 47/125 |
| 2018/0027060 | A1* | 1/2018 | Metsch | G06F 9/544 |
| | | | | 709/226 |
| 2018/0097845 | A1* | 4/2018 | Chen | H04L 43/065 |
| 2018/0136931 | A1 | 5/2018 | Hendrich et al. | |
| 2018/0159745 | A1 | 6/2018 | Byers et al. | |
| 2018/0255150 | A1 | 9/2018 | Williams et al. | |
| 2018/0314550 | A1 | 11/2018 | Chen et al. | |
| 2018/0331969 | A1* | 11/2018 | Chen | G06F 9/5083 |
| 2018/0349174 | A1 | 12/2018 | Vyas et al. | |
| 2019/0036783 | A1* | 1/2019 | Xu | H04L 41/0233 |
| 2019/0116110 | A1* | 4/2019 | Raney | G06F 8/60 |
| 2019/0220319 | A1* | 7/2019 | Parees | G06F 9/5027 |
| 2019/0230027 | A1* | 7/2019 | Murgia | H04L 45/70 |
| 2019/0266453 | A1* | 8/2019 | Rodriguez | G06V 20/10 |
| 2019/0297011 | A1* | 9/2019 | Nainar | H04L 43/10 |
| 2020/0028894 | A1* | 1/2020 | Memon | G06F 3/0605 |
| 2020/0250006 | A1* | 8/2020 | Parekh | H04L 67/1008 |
| 2020/0310881 | A1* | 10/2020 | Gonzalez | G06F 9/5022 |
| 2021/0103468 | A1* | 4/2021 | Wang | G06F 9/5044 |
| 2021/0240541 | A1* | 8/2021 | Kuik | G06F 9/5077 |
| 2022/0014451 | A1* | 1/2022 | Naik | H04L 45/02 |

OTHER PUBLICATIONS

Kubernetes, "Configure Multiple Schedulers", available online at <https://web.archive.org/web/20190411133249/https://kubernetes.io/docs/tasks/administer-cluster/configure-multiple-schedulers/>, Apr. 11, 2019, 10 pages.

Kubernetes, "Production-Grade Container Orchestration", available online at <https://web.archive.org/web/20190425004353/https://kubernetes.io/>, Apr. 25, 2019, 7 pages.

Kubernetes, "Reference", available online at <https://web.archive.org/web/20190326024806/https://kubernetes.io/docs/reference/>, Mar. 26, 2019, 4 pages.

RedHat OpenShift, "OpenShift Container Platform 3.7 Documentation", available online at <https://web.archive.org/web/20180914051445/https://docs.openshift.com/container-platform/3.7/welcome/index.html>, Sep. 14, 2018, 4 pages.

Scott M. Fulton III, "Docker Who? By Acquiring CoreOS, Red Hat Aims to Be the Kubernetes Company", available online at <https://thenewstack.io/docker-acquiring-coreos-red-hat-aims-kubernetes-company/>, Feb. 5, 2018, 13 pages.

* cited by examiner

LOCATION-BASED VIRTUALIZATION WORKLOAD PLACEMENT

BACKGROUND

Cloud computing has significantly affected the way Information Technology ("IT") infrastructure is being consumed. With the help of virtualization technology, it is possible to deploy workloads using a variety of virtual infrastructure ranging from public cloud environments to on premise data centers that rely on local hardware. New workloads are continuously being created, deployed, and consumed for applications via such virtual infrastructure.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Virtual Machines ("VMs") are a popular mechanism for deploying cloud computing application infrastructure. In some implementations, multiple instances of a VM can share the same physical hardware and each application VM can have its own set of operating system, networking and storage. In some circumstances, it may be preferable to deploy an application workload using virtualized containers rather than VMs. As used herein, the term "containers" can, for example, refer to operating-system-level virtualization in which a kernel or other mechanism allows for multiple isolated user-space instances. Such instances can, for example, be referred to as containers, partitions, virtualization engines ("VEs"), jails, or another suitable term. Such instances can, for example, be designed to look like real computers from the point of view of programs running in them. In comparison to a conventional computer program, which may have visibility of all resources (e.g., connected devices, files and folders, network shares, Central Processing Unit ("CPU") power, quantifiable hardware capabilities) of the computer running the program, programs running inside a container can be designed to have visibility limited to the container's contents and specific devices assigned to the container. Such containers can, in some implementations, include additional isolation mechanisms that can provide resource-management features to limit the impact of one container's activities on other containers.

Containerized infrastructure is one of the fastest growing markets in IT today. Kubernetes has become the de facto standard for container cluster management and workload orchestration, and yet it is completely unaware of network topology and utilization. That is, unlike CPU/memory and storage, networking—the third pillar of DevOps IT infrastructure—is completely missing from workload scheduling and placement. It is therefore possible, indeed likely, that application pods will be randomly scheduled onto nodes (e.g., servers) spread across the entire cluster, potentially with higher than necessary or desired network latency between multiple containers implementing a given microservice or application. This can, for example, lower overall network and datacenter efficiency and can drive the industry towards overprovisioned networking designs. Existing approaches to node proximity are available with affinity constraints. However, these limit scheduling to the exact same node, rather than any node directly connected to the same network switch(es) as existing application pods. Additional approaches use manual node and pod labeling to identify location for proximity scheduling. Neither of these is automated or automatable, nor can they include network utilization criteria.

Workload placement is a critical problem in managing data center efficiency. Certain implementations of the present disclosure are directed to location-based virtualization workload placement. In some implementations, a method can, for example, include: (a) receiving, with a computer virtualization scheduler, network locality information for virtualization equipment; (b) receiving, with the computer virtualization scheduler, network utilization information for virtualization equipment; and (c) determining, with the computer virtualization scheduler and based on the received network locality information and the received network utilization information, virtualization workload placement in order to maximize available network bandwidth and minimize network latency between virtualization equipment. Certain implementations of the present disclosure are directed to introduce network awareness and automation to Kubernetes container pod scheduling, and detail implementations for OpenShift and native Kubernetes. Such an approach can, in some situations, provide improved resource efficiency on OpenShift with Kubernetes scheduler extensions for network locality on compute nodes and composable fabric.

As used herein, "composable fabric" and related terms can, for example, refer to a software-defined networking fabric purpose-built for workload-driven performance and scale. Such a fabric can, for example, address issues at the data plane, the control plane, and the integration plane. At the data plane, rack connectivity modules can, for example, form a composable network fabric or data plane that provides physical connectivity, topology, and data/packet forwarding. In such a fabric, connectivity and routing can, for example, be collapsed into a single building block without the use of dedicated spine switches. In such a fabric, the control and management plane can, for example, supplement the embedded protocols used in the data plane and provide a single point of management for the network while also providing APIs to directly manipulate the network state and objects from external systems.

Certain implementations of the present disclosure provide for an application workload or workload orchestration system being able to query the network for input on workload placement.

Certain implementations of the present disclosure may leverage network proximity when scheduling containerized applications to reduce latency and increase overall network efficiency. Certain implementations of the present disclosure allow the orchestration system to query the network and receive a set of resources that meet specific performance based requirements. Using that information, the orchestration system can, for example, tune the workload placement to satisfy resource availability and performance requirements. Other advantages of implementations presented herein will be apparent upon review of the description and figures.

Figure 1:
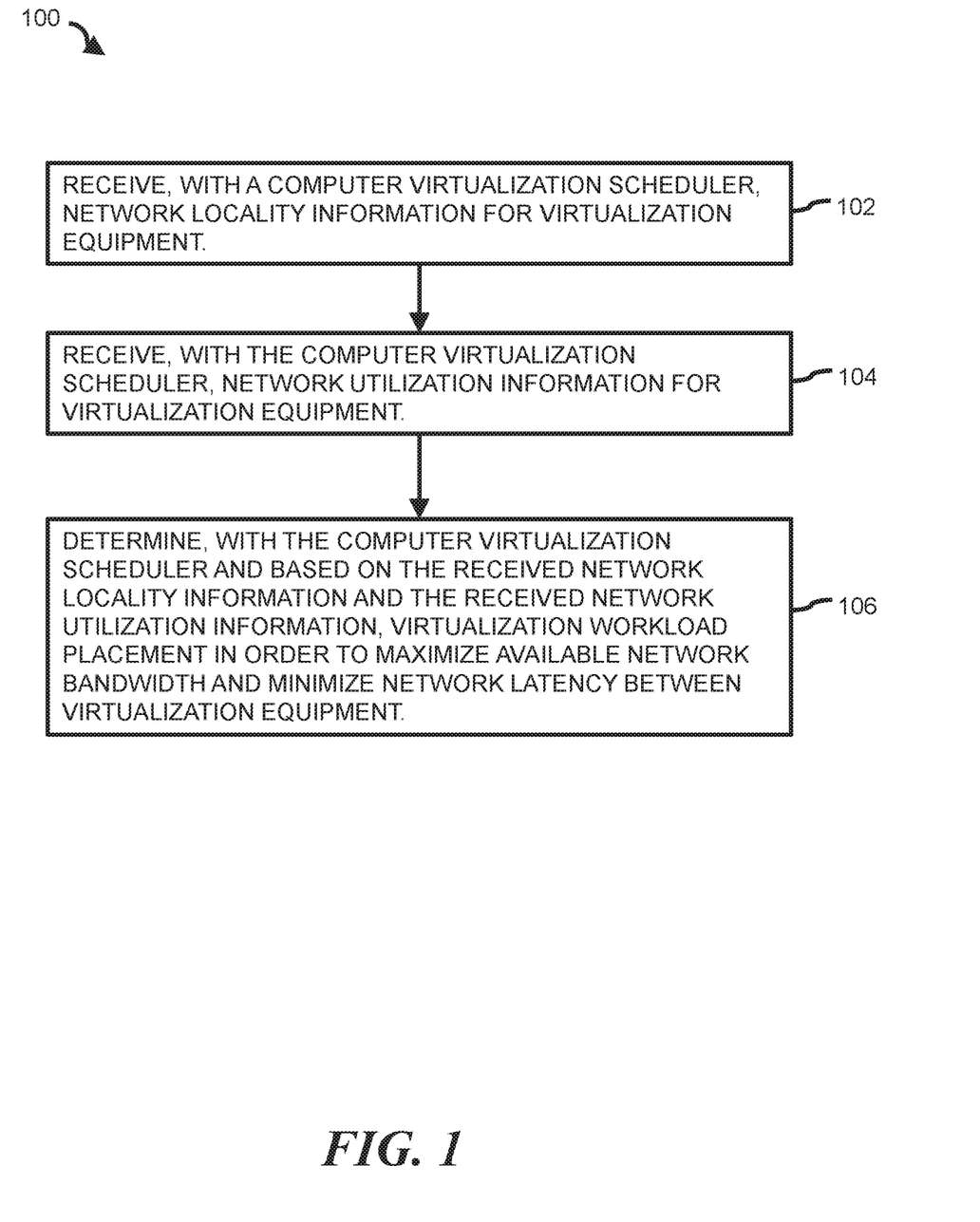
FIG. 1 is a flowchart for a method, according to an example.

FIG. 1 illustrates a flowchart for an example method 100 related to location-based virtualization workload placement. In some implementations, method 100 can be implemented or otherwise executed through the use of executable instructions stored on a memory resource (e.g., the memory resource of the computing device of FIG. 6), executable machine readable instructions stored on a storage medium (e.g., the medium of FIG. 7), in the form of electronic circuitry (e.g., on an Application-Specific Integrated Circuit (ASIC)), and/or another suitable form. Although the description of method 100 herein primarily refers to steps performed on a server for purposes of illustration, it is appreciated that in some implementations, method 100 can be executed on another computing device within a networked environment or in data communication within a networked environment. In some implementations, method 100 can be executed on network devices in parallel (e.g., in a distributed computing fashion).

Method 100 includes receiving (at block 102), with a computer virtualization scheduler, network locality information for virtualization equipment. The computer virtualization scheduler can, for example, be a containerized application scheduler or container application pod scheduler, as described in further detail herein. The term "virtualization equipment" and related terms used herein can, for example, refer to any suitable equipment for virtualization, such as certain servers, network switches, storage devices, etc.

The term "network locality information" and related terms used herein can, for example, refer to physical topology information of virtualization equipment within a single rack and/or multiple racks of a data center. Further examples of such network locality information are provided herein. In some implementations, the network locality information is inputted via labels by a network administrator. In some implementations, the network locality information is inputted automatically based on configured network topology information.

Method 100 includes receiving (at block 104), with the computer virtualization scheduler, network utilization information for virtualization equipment. The term "network utilization information" and related terms used herein can, for example, refer to latency levels, bandwidth levels, and/or switch connectivity information. Other examples of such network utilization information are provided herein with respect to specific example implementations of the present disclosure.

Method 100 includes determining (at block 106), with the computer virtualization scheduler and based on the received network locality information and the received network utilization information, virtualization workload placement in order to maximize available network bandwidth and minimize network latency between virtualization equipment. The term "workload placement" and related terms used herein can, for example, refer to selecting a plurality of servers to run a virtualized resource, such as, for example, a containerized microservice or application.

The workload placement of block 106 can, for example, be determined by a number of suitable factors beyond those explicitly mentioned above. For example, in some implementations, be based on factors including CPU, memory, and storage utilization. In some implementations, the workload placement is determined to minimize a number of network switch transits (or "hops") between nodes of the virtualization equipment.

The workload placement of block 106 can, for example, be determined by prioritizing and/or ranking certain nodes based on certain factors described above or other suitable factors. For example, in some implementations, the workload placement allows for ranking the set of potential containerization nodes in order to optimize for low latency, high bandwidth, and/or direct switch connectivity. In some implementations, determining virtualization workload placement includes prioritizing nodes based on network locality. In some implementations, the workload placement is determined by prioritizing virtualization equipment that leads to a reduction in a number of hops for a containerized application. In some implementations, the workload placement is determined by prioritizing high-bandwidth links between nodes in a data center. In some implementations, the workload placement is determined by ranking available nodes in a data center based in part on location and bandwidth. In some implementations, the workload placement is determined by ranking a set of potential containerization nodes based on network utilization of the nodes. In some implementations, workload placement allows for ranking the potential containerization nodes, while allowing for application-specific customization of the ranked set of potential containerization nodes.

Figure 2:
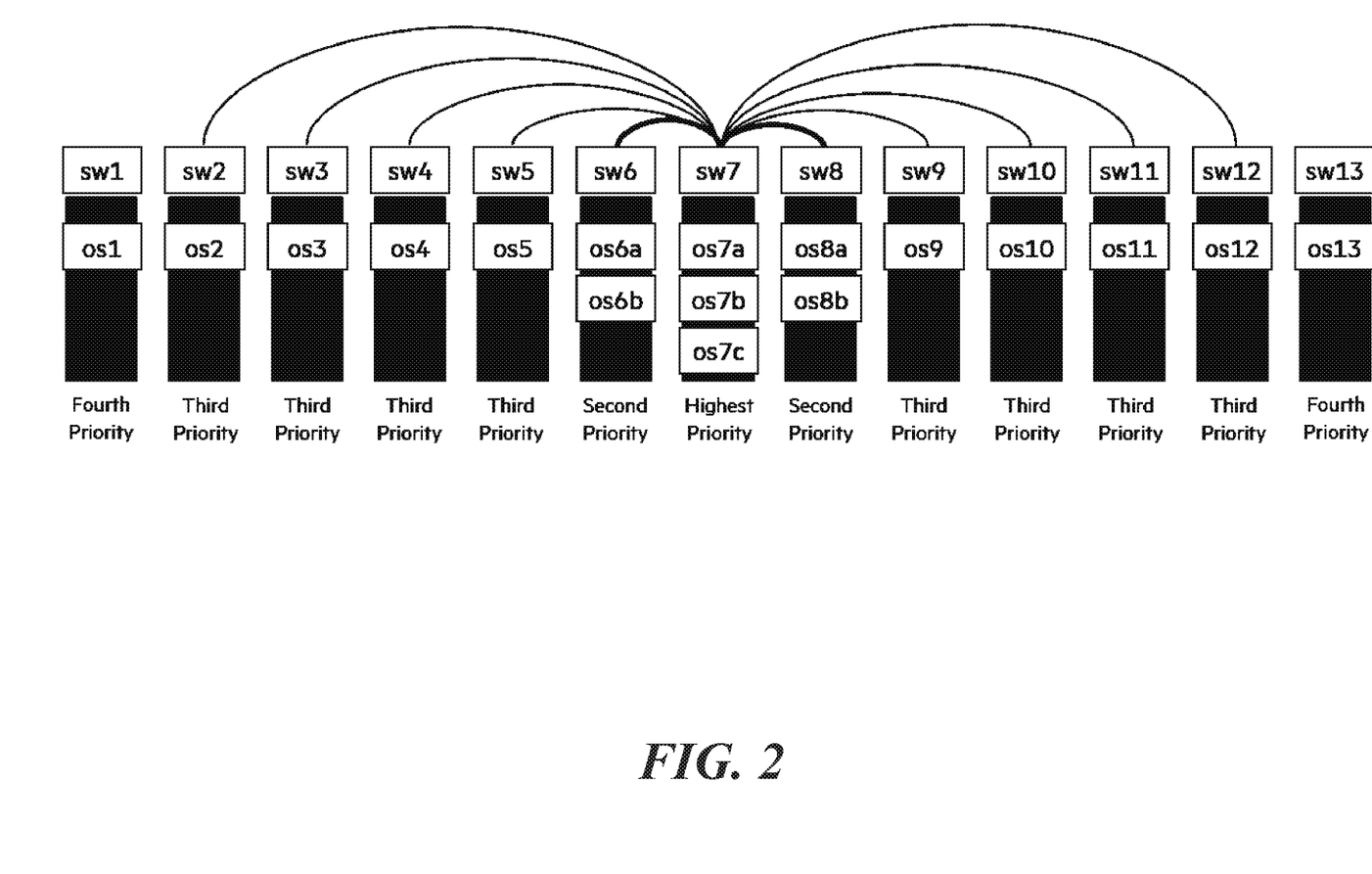
FIG. 2 is an illustration of an example "default" network locality setting.
Figure 3:
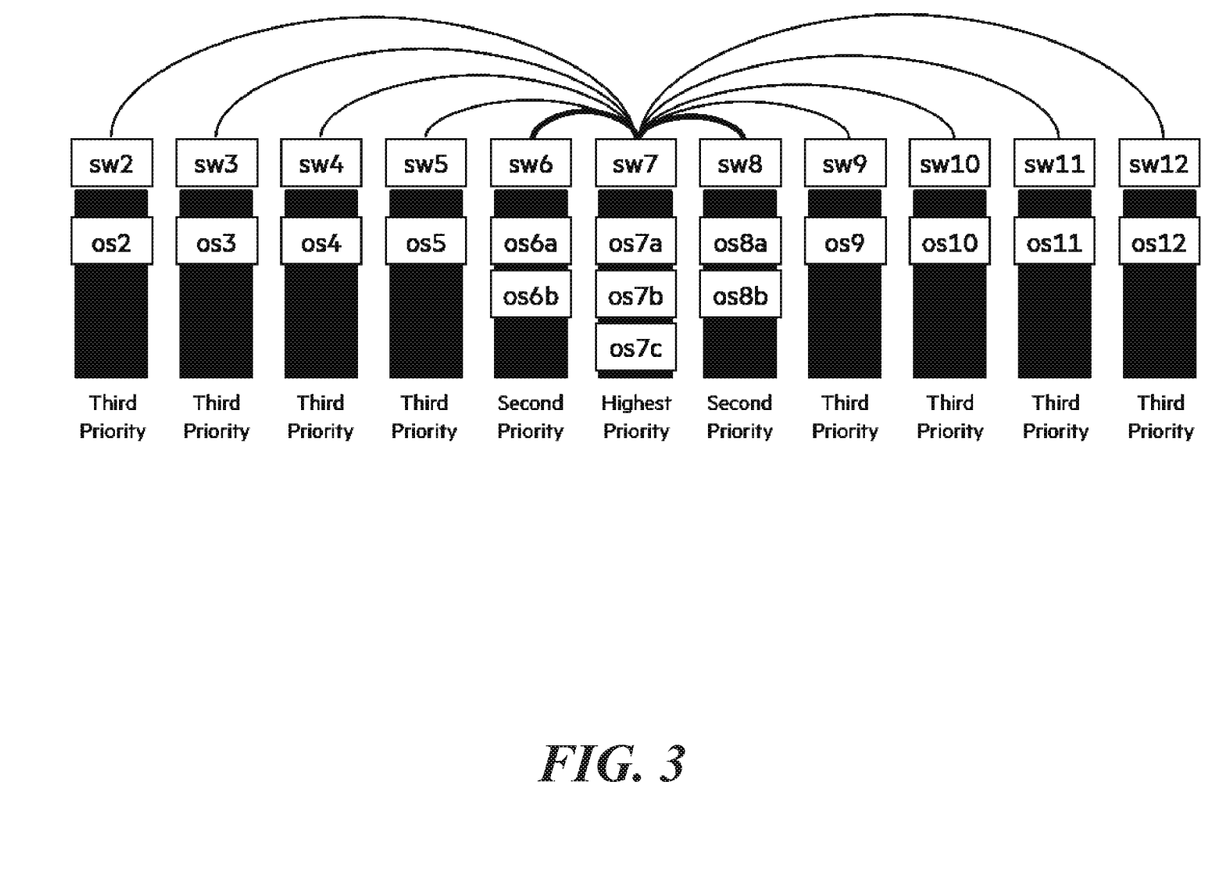
FIG. 3 is an illustration of an example "local" network locality setting.
Figure 4:
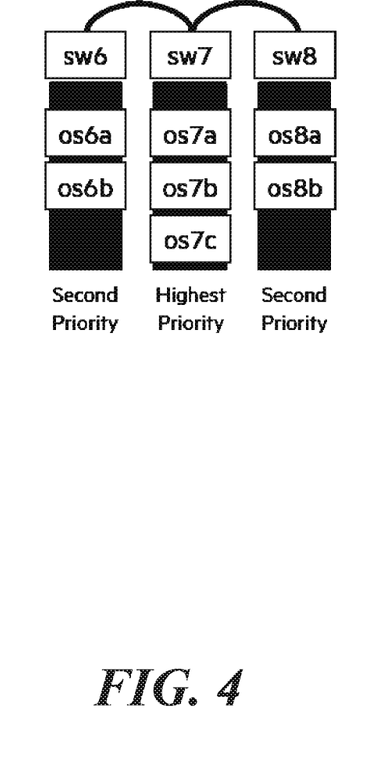
FIG. 4 is an illustration of an example "adjacent" network locality setting.
Figure 5:
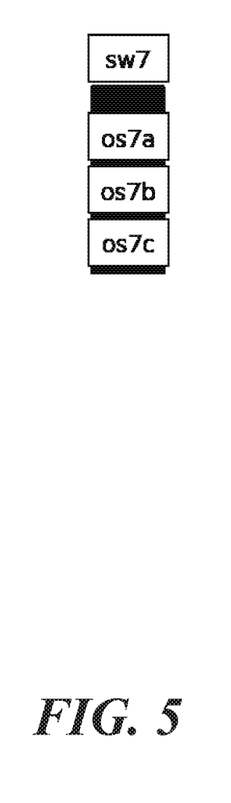
FIG. 5 is an illustration of an example "direct" network locality setting.

In some implementations, various predetermined workload placement determination configurations can be provided. A few example configurations are provided below:

Default (See FIG. 2)
    Filter—No adjustment
    Prioritize—Add network/fabric utilization to existing CPU/Mem/Disk criteria
Local (See FIG. 3)
    Filter—Remove nodes further than one switch hop from existing project/app nodes
    Prioritize—Add network utilization criteria; sort by fabric utilization
Adjacent (See FIG. 4)
    Filter—Remove nodes further than one rack away from existing project/app nodes
    Prioritize—Add network utilization criteria; sort by fabric utilization
Direct (See FIG. 5)
    Filter—Remove nodes not in rack(s) already used by project/application
    Prioritize—Add network utilization to existing CPU/Mem/Disk criteria It is appreciated that one or more operations of method 100 can be performed periodically. For example, in some implementations, one or more of blocks 102, 104, and 106 (or other operations described herein) may be performed periodically. The various period times for blocks 102, 104, and 106 (or other operations described herein) may be the same or different times. For example, in some implementations, the period of block 102 is every 1 minute and the period of block 104 is every 2 minutes. It is further appreciated, that the period for a given block may be regular (e.g., every 1 minute) or may be irregular (e.g., every 2 minutes during a first condition, and every 3 minutes during a second network condition). In some implementations, one or more of block 102, 104, and 106 (or other operations described herein) may be non-periodic and may be triggered by some network or other event.

Although the flowchart of FIG. 1 shows a specific order of performance, it is appreciated that this order may be rearranged into another suitable order, may be executed concurrently or with partial concurrence, or a combination thereof. Likewise, suitable additional and/or comparable steps may be added to method 100 or other methods described herein in order to achieve the same or comparable functionality. In some implementations, one or more steps are omitted. For example, in some implementations, block 104 of receiving network utilization information can be omitted from method 100 or performed by a different device. It is appreciated that blocks corresponding to additional or alternative functionality of other implementations described herein can be incorporated in method 100. For example, blocks corresponding to the functionality of various aspects of implementations otherwise described herein can be incorporated in method 100 even if such functionality is not explicitly characterized herein as a block in method 100.

Various example implementations for the present disclosure will now be described. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

In some implementations of the present disclosure, datacenter network topology and locality data are added to the Kubernetes infrastructure through existing mechanisms (labels and/or annotations). A network topology aware pod scheduling engine is connected to the existing Kubernetes scheduler extension framework to add scheduling modules for filtering and prioritizing nodes for pod scheduling using network data. These extensions can, for example, expand Kubernetes cluster scheduling capabilities to include datacenter network proximity and constraints. Network proximity scheduling constraints can, for example, optimize for low latency, high bandwidth, or direct switch connectivity, and include the identification of existing running pods for the given micro-service or application.

It is appreciated that datacenter network topology can, for example, be constructed in multiple phases. The first phase is implemented on the server nodes, and consists of capturing each server's physical network configuration and annotating the Kubernetes Application Programming Interface ("API") entry for that server node with the physical network configuration, specifically the Media Access Control ("MAC") address of each physical network interface controller ("NIC"). The second phase is implemented on the datacenter network controller using interconnection (peering) data from the datacenter switches indicating all internal connections between datacenter switches. This data can be used to build a connectivity map between datacenter switches including potential available bandwidth with peer switches. The server node network adapters can then be mapped to the datacenter network topology using network neighbor advertisements (Link Layer Discovery Protocol ("LLDP") packets) or direct MAC address lookup from the datacenter switches. Thus an entire network topology map including the datacenter switches and server nodes is constructed including all available interconnect paths and including available bandwidth on each interconnect path.

According to certain implementations of the present disclosure, Kubernetes pod scheduling can be enhanced with network-aware filtering and prioritization methods through existing scheduler extension mechanisms. The filtering method can, for example, eliminate candidate nodes not conforming to the requested network locality. A prioritization method used by certain implementations of the present disclosure can, for example, rank the remaining nodes (after filtering) in order of available fabric bandwidth to/from each remaining node.

In certain implementations, a number of network locality settings may be requested, including direct (FIG. 5), adjacent (FIG. 4), local (FIG. 3), default (FIG. 2), or disabled. Any setting may be cluster-wide or application specific. Such a "direct" locality setting can, for example, request the container pods of a given application/project/namespace (hereafter, just "application") be scheduled on nodes that are all connected to the same datacenter switch or switches. Such an "adjacent" locality setting can, for example, request application container pods be scheduled on nodes connected to switches a single hop away (no intervening switches) and with the most available bandwidth between these switches. Such a "local" locality setting can, for example, request application container pods be scheduled on nodes connected to switches a single hop away (no intervening switches) regardless of available bandwidth between these switches. Such a "default" locality setting can, for example, allow placement on any node in the cluster. Such a "disabled" locality setting can, for example, remove network considerations from the Kubernetes scheduling process altogether. In all of the above cases (except disabled in some implementations), available candidate nodes can, for example, be prioritized by available bandwidth.

Certain of the proposed implementations can, for example, provide Kubernetes a cluster-wide scheduling algorithm default as well as user definable overrides per application or for specific container pods within an application. These user-definable overrides can be achieved simply through the use of existing labelling mechanisms in the Kubernetes API with defined label names and values.

It is appreciated that certain implementations of the present disclosure can be focused on a single layer—the data center network, and optimizing a locality within that fabric, including non-hierarchical network topologies. Certain existing solutions reference the concept of node proximity for scheduling in the area of failure domain proximity. Such solutions seek to prevent too many application container pods from being scheduled within a given failure domain. The present disclosure is complimentary to this work, as it focuses on entities beyond a single node but within a single fabric's failure domain. Both solutions could co-exist in a single environment, with one set of scheduling extensions nudging pods further apart, relative to defines boundaries, and the other nudging pods within boundaries closer together.

Certain existing solutions are concerned with the scheduling of single containers rather than collections of application containers. In such a solution, it is likely that a first node is randomly selected. If that node is deemed inappropriate, a "second" node is selected from the matrix. Certain implementations of the present disclosure include a cooperative approach whereby network locality attributes (e.g., latency and/or bandwidth "distance") are included in a larger node selection process that includes, among other possibilities, CPU load, memory load, disk usage, and affinity/anti-affinity, in a holistic scheduling process.

Figure 6:
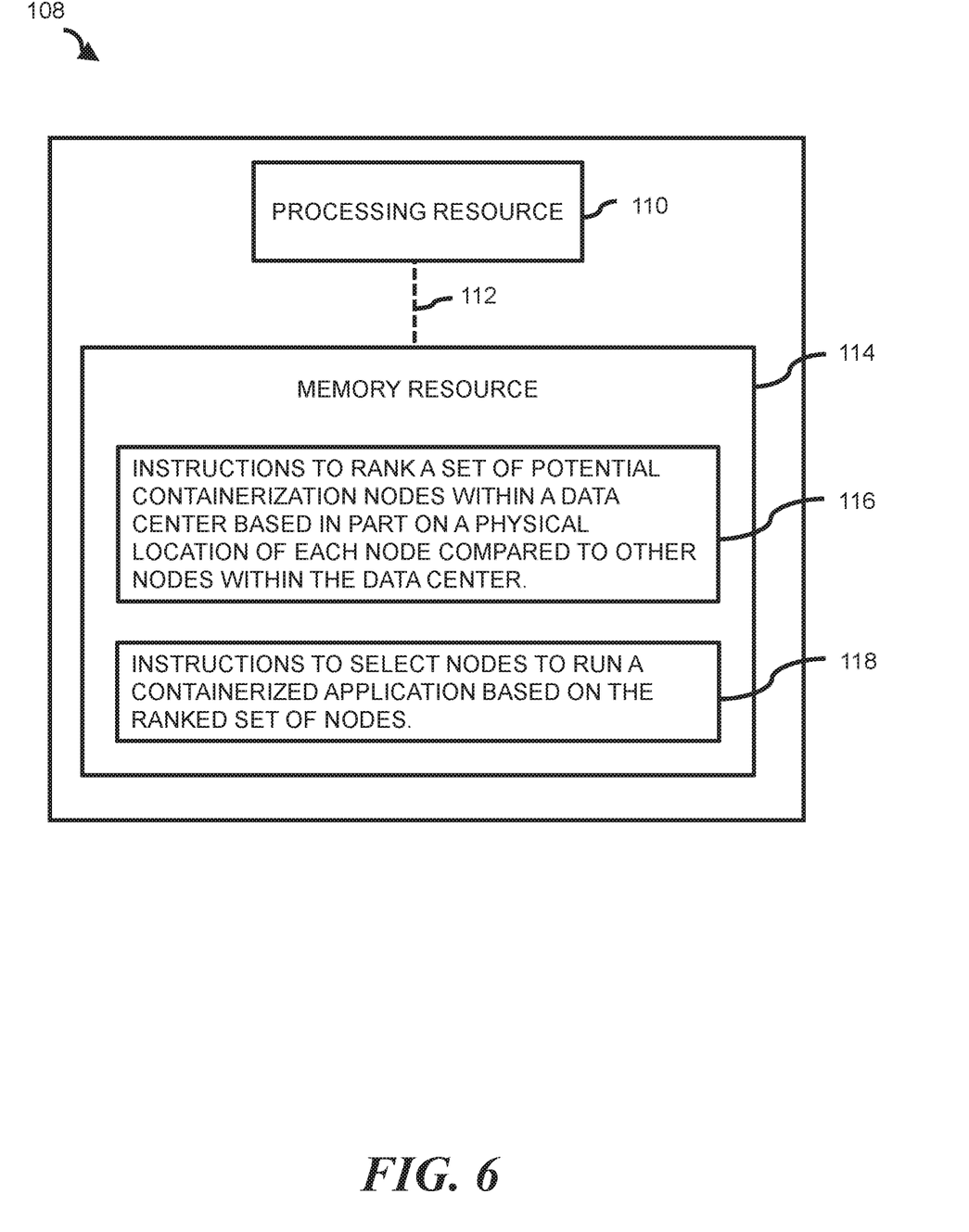
FIG. 6 is a diagram of a computing device, according to an example.

FIG. 6 is a diagram of a computing device 108 that can, for example, serve as a containerized application scheduling system in accordance with the present disclosure. Computing device 108 can, for example, be in the form of a server or another suitable computing device within a network environment or in communication with a network environment or equipment thereof. As described in further detail below, computing device 108 includes a processing resource 110 and a memory resource 114 that stores machine-readable instructions 116 and 118. For illustration, the description of computing device 108 makes reference to various aspects of certain diagrams, methods, and other specific implementations herein. However it is appreciated that computing device 108 can include additional, alternative, or fewer aspects, functionality, etc., than the implementations described elsewhere herein and is not intended to be limited by the related disclosure thereof.

Instructions 116 stored on memory resource 114 are, when executed by processing resource 110, to cause processing resource 110 to rank a set of potential containerization nodes within a data center based in part on a physical location of each node compared to other nodes within the data center. Instructions 116 can incorporate one or more aspects of blocks of method 100 or another suitable aspect of other implementations described herein (and vice versa). For example, in some implementations, instructions 116 are to cause the processing resource to rank the set of potential containerization nodes based on network utilization of the nodes. Instructions 118 stored on memory resource 114 are, when executed by processing resource 110, to cause processing resource 110 to select nodes to run a containerized application based on the ranked set of nodes. Instructions 116 can incorporate one or more aspects of blocks of method 100 or another suitable aspect of other implementations described herein (and vice versa).

Processing resource 110 of computing device 108 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 114, or suitable combinations thereof. Processing resource 110 can, for example, include single or multiple cores on a chip, multiple cores across multiple chips, multiple cores across multiple devices, or suitable combinations thereof. Processing resource 110 can be functional to fetch, decode, and execute instructions as described herein. As an alternative or in addition to retrieving and executing instructions, processing resource 110 can, for example, include at least one integrated circuit (IC), other control logic, other electronic circuits, or suitable combination thereof that include a number of electronic components for performing the functionality of instructions stored on memory resource 114. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 110 can, for example, be implemented across multiple processing units and instructions may be implemented by different processing units in different areas of computing device 108.

Memory resource 114 of computing device 108 can, for example, be in the form of a non-transitory machine-readable storage medium, such as a suitable electronic, magnetic, optical, or other physical storage apparatus to contain or store information such as machine-readable instructions 116 and 118. Such instructions can be operative to perform one or more functions described herein, such as those described herein with respect to method 100 or other methods described herein. Memory resource 114 can, for example, be housed within the same housing as processing resource 110 for computing device 108, such as within a computing tower case for computing device 108 (in implementations where computing device 108 is housed within a computing tower case). In some implementations, memory resource 114 and processing resource 110 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 114 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 114 can be in communication with processing resource 110 via a communication link 112. Each communication link 112 can be local or remote to a machine (e.g., a computing device) associated with processing resource 110. Examples of a local communication link 112 can include an electronic bus internal to a machine (e.g., a computing device) where memory resource 114 is one of volatile, non-volatile, fixed, and/or removable storage medium in communication with processing resource 110 via the electronic bus.

In some implementations, one or more aspects of computing device 108 can be in the form of functional modules that can, for example, be operative to execute one or more processes of instructions 116 or 118 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 108 can, for example, include one or more machine-readable storage mediums and one or more computer processors.

In view of the above, it is appreciated that the various instructions of computing device 108 described above can correspond to separate and/or combined functional modules.

For example, instructions 116 can correspond to a "ranking module" to rank a set of potential containerization nodes within a data center based in part on a physical location of each node compared to other nodes within the data center. Likewise, instructions 118 can correspond to a "node selection module" to select nodes to run a containerized application based on the ranked set of nodes. It is further appreciated that a given module can be used for multiple functions. As but one example, in some implementations, a single module can be used to both rank potential containerization nodes (e.g., corresponding to the functionality of instructions 116) as well as to select nodes (e.g., corresponding to the functionality of instructions 118).

One or more implementations of the present disclosure can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other network equipment. The communication module can, for example, include machine-readable instructions for use with communication the communication module, such as firmware for implementing physical or virtual network ports.

Figure 7:
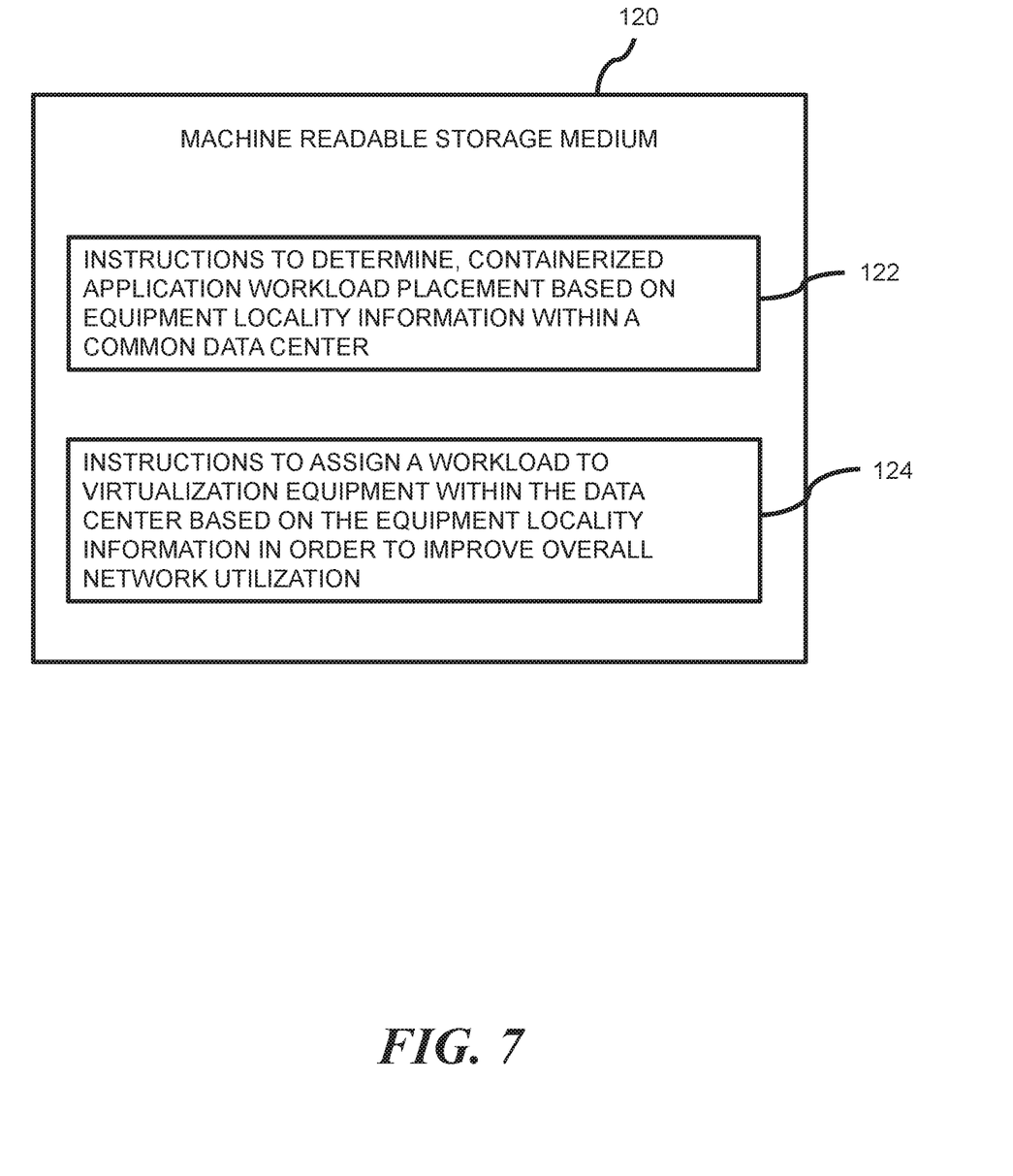
FIG. 7 is a diagram of machine-readable storage medium, according to an example.

FIG. 7 illustrates a machine-readable storage medium 120 including various instructions that can be executed by a computer processor or other processing resource. In some implementations, medium 120 can be housed within a server, on another computing device within a network environment, or in local or remote wired or wireless data communication within a networked environment. For illustration, the description of machine-readable storage medium 120 provided herein makes reference to various aspects of computing device 108 (e.g., processing resource 110) and other implementations of the disclosure (e.g., method 100). Although one or more aspects of computing device 108 (as well as instructions such as instructions 116 and 118) can be applied to or otherwise incorporated with medium 120, it is appreciated that in some implementations, medium 120 may be stored or housed separately from such a system. For example, in some implementations, medium 120 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 120 includes machine-readable instructions 122 stored thereon to cause processing resource 110 to determine containerized application workload placement based on equipment locality information within a common data center. Instructions 116 can, for example, incorporate one or more aspects of block 106 of method 100 or another suitable aspect of other implementations described herein (and vice versa). For example, in some implementations, the workload placement is determined to minimize a number of hops between nodes of the virtualization equipment.

Medium 120 includes machine-readable instructions 124 stored thereon to cause processing resource 110 to assign a workload to virtualization equipment within the data center based on the equipment locality information in order to improve overall network utilization. Instructions 118 can, for example, incorporate one or more aspects of block 106 of method 100 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
receiving, by a computer virtualization scheduler operable to utilize network proximity to select nodes of a plurality of nodes of virtualization equipment within a data center on which to run one or more virtualized resources, network locality information for the virtualization equipment indicative of a physical topology of the virtualization equipment, including rack commonality or rack adjacency;
receiving, by the computer virtualization scheduler, network utilization information for virtualization equipment indicative of available network bandwidth and network latency on paths interconnecting the plurality of nodes of the virtualization equipment through a network;
eliminating, by the computer virtualization scheduler, one or more nodes from the plurality of nodes based at least on a physical location of each node of the plurality of nodes compared to other nodes of the plurality of nodes;
prioritizing, by the computer virtualization scheduler, remaining nodes of the plurality of nodes based on a network locality setting indicative of a requested network locality between nodes on which the one or more virtualized resources are placed; and
maximizing the available network bandwidth and minimizing the network latency between the virtualization equipment by determining, by the computer virtualization scheduler and based on the received network locality information and the received network utilization information, a virtualization workload placement for the one or more virtualized resources utilizing one or more of the remaining nodes.

2. The method of claim 1, wherein the computer virtualization scheduler is a containerized application scheduler.

3. The method of claim 1, wherein the computer virtualization scheduler is a container application pod scheduler.

4. The method of claim 1, wherein the virtualization equipment includes servers for running containerized applications.

5. The method of claim 1, wherein determining virtualization workload placement is further based on other factors, including Central Processing Unit (CPU), memory, and storage utilization.

6. The method of claim 1, wherein the physical topology includes information indicative of a rack of multiple racks of the data center within which the virtualization equipment is located.

7. The method of claim 1, wherein the physical topology includes information indicative of a single rack of the data center within which the virtualization equipment is located.

8. The method of claim 1, wherein the determined virtualization workload placement includes selecting a plurality of servers to run a containerized microservice or application.

9. The method of claim 1, wherein the network locality information is inputted via labels by a network administrator.

10. The method of claim 1, wherein the network locality setting comprises at least one of: a direct locality setting, an adjacent locality setting, a local locality setting, a default locality setting, or a disabled locality setting.

11. A non-transitory machine readable storage medium having stored thereon machine readable instructions to cause a computer processor to:
receive, by a containerized application scheduler operable to utilize network proximity to select nodes of a plurality of nodes of virtualization equipment within a common data center on which to run one or more virtualized resources, equipment locality information for the virtualization equipment indicative of a physical topology of the virtualization equipment, including rack commonality or rack adjacency;
eliminate, by the containerized application scheduler, one or more nodes from the plurality of nodes based at least on a physical location of each node of the plurality of nodes compared to other nodes of the plurality of nodes;
prioritize, by the containerized application scheduler, remaining nodes of the plurality of nodes based on a equipment locality setting indicative of a requested equipment locality between nodes on which the one or more virtualized resources are placed;
determine, by the containerized application scheduler, containerized application workload placement based on the equipment locality information; and
improve overall network utilization of available bandwidth on paths interconnecting a plurality of nodes of the virtualization equipment through a network by assigning a workload to a node of the plurality of nodes based on the equipment locality information.

12. The medium of claim 11, wherein the workload placement is determined by minimizing a number of hops between the plurality of nodes of the virtualization equipment.

13. The medium of claim 11, wherein the workload placement is determined by prioritizing those nodes of the plurality of node of the virtualization equipment that lead to a reduction in a number of hops for a containerized application.

14. The medium of claim 11, wherein the workload placement is determined by prioritizing high-bandwidth links of the paths between the plurality of nodes.

15. The medium of claim 11, wherein the workload placement is determined by ranking available nodes of the plurality of nodes based in part on their respective location within the physical topology and the available bandwidth.

16. A system comprising:
a processing resource; and
a memory resource storing machine readable instructions to cause the processing resource to:
receive network locality information for virtualization equipment indicative of a physical topology of the virtualization equipment within a data center, including rack commonality or rack adjacency;
receive network utilization information for virtualization equipment indicative of available network bandwidth and network latency on paths interconnecting nodes of the virtualization equipment through a network;
eliminate one or more nodes from the plurality of nodes based at least on a physical location of each node of the plurality of nodes compared to other nodes of the plurality of nodes;
prioritize remaining nodes of the plurality of nodes based on a network locality setting indicative of a requested network locality between nodes on which the one or more virtualized resources are placed; and
maximize the available network bandwidth and minimize the network latency between the virtualization equipment by determining, based on the received network locality information and the received network utilization information, a virtualization workload placement for the one or more virtualized resources utilizing one or more of the remaining nodes.

17. The system of claim 16, wherein the instructions further cause the processing resource to:
rank a set of potential containerization nodes within the virtualization equipment based in part on a physical location of each node of the set of potential containerization nodes compared to other nodes of the set of potential containerization nodes; and
select a subset of the set of potential containerization nodes to run a containerized application based on the ranked set of potential containerization nodes.

18. The system of claim 17, wherein the instructions further cause the processing resource to rank the set of potential containerization nodes based on network utilization of each node of the set of potential containerization nodes.

19. The system of claim 17, wherein the instructions further cause the processing resource to provide a default approach for ranking the set of potential containerization nodes, while allowing for application-specific customization of the ranked set of potential containerization nodes.

20. The system of claim 17, wherein the instructions further cause the processing resource to optimize for one or more of low latency, high bandwidth, and direct switch connectivity by ranking the set of potential containerization nodes.

21. The system of claim 16, wherein the network locality setting comprises at least one of: a direct locality setting, an adjacent locality setting, a local locality setting, a default locality setting, or a disabled locality setting.

* * * * *